US012770509B2

(12) United States Patent
Ito

(10) Patent No.: US 12,770,509 B2
(45) Date of Patent: Oct. 20, 2026

(54) IN-VEHICLE DISPLAY SYSTEM AND METHOD FOR CONTROLLING IN-VEHICLE DISPLAY SYSTEM

(71) Applicant: TOYOTA JIDOSHA KABUSHIKI KAISHA, Toyota (JP)

(72) Inventor: Hironori Ito, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 19/062,671

(22) Filed: Feb. 25, 2025

(65) Prior Publication Data

US 2025/0285537 A1 Sep. 11, 2025

(30) Foreign Application Priority Data

Mar. 5, 2024 (JP) ................................ 2024-032820

(51) Int. Cl.

| | |
|---|---|
| ***B60R 21/0134*** | (2006.01) |
| ***G01S 13/931*** | (2020.01) |
| ***G01S 17/931*** | (2020.01) |
| ***G08G 1/0967*** | (2006.01) |
| ***G08G 1/16*** | (2006.01) |
| ***G09G 5/00*** | (2006.01) |

(52) U.S. Cl.

CPC ....... *G08G 1/096708* (2013.01); *G09G 5/003* (2013.01); *G09G 2340/0464* (2013.01); *G09G 2380/10* (2013.01)

(58) Field of Classification Search

CPC ............. G08G 1/096708; G09G 5/003; G09G 2340/0464; G09G 2380/10

See application file for complete search history.

(56) References Cited

U.S. PATENT DOCUMENTS

| | | | | |
|---|---|---|---|---|
| 6,373,400 | B1 * | 4/2002 | Fujita | B60K 35/10 340/904 |
| 7,903,048 | B2 * | 3/2011 | Yanagisawa | G02B 27/01 345/9 |
| 9,796,280 | B2 * | 10/2017 | McCool | B60L 53/12 |
| 10,169,885 | B2 * | 1/2019 | Sumikawa | B60K 35/10 |
| 10,210,405 | B2 * | 2/2019 | Yokochi | B60K 35/215 |

(Continued)

FOREIGN PATENT DOCUMENTS

| | | |
|---|---|---|
| JP | 2001-199257 A | 7/2001 |
| JP | 2004-038820 A | 2/2004 |
| JP | 2023-117717 A | 8/2023 |

*Primary Examiner* — Quang Pham

(74) *Attorney, Agent, or Firm* — Dinsmore & Shohl LLP

(57) ABSTRACT

An in-vehicle display system that displays a situation around the host vehicle on a display in a vehicle cabin includes a display control unit configured to display a preceding vehicle icon on a driving lane area of the display when a preceding vehicle is detected. The driving lane area includes a near display area, a first display area located at a back of the near display area, and a second display area located at a back of the first display area. The display control unit displays a second preceding vehicle icon in the second display area when a second preceding vehicle traveling ahead of the preceding vehicle is detected, and moves the second preceding vehicle icon from the second display area to the first display area when the preceding vehicle leaves the driving lane of the host vehicle while the second preceding vehicle is being detected.

5 Claims, 6 Drawing Sheets

(56) References Cited

U.S. PATENT DOCUMENTS

| | | | | |
|---|---|---|---|---|
| 10,919,449 | B2 * | 2/2021 | Shimomura | B60W 30/143 |
| 11,763,681 | B2 * | 9/2023 | Fassbender | B60Q 1/525 340/436 |
| 12,017,652 | B2 * | 6/2024 | Baumgarten | B60K 35/28 |
| 12,024,190 | B1 * | 7/2024 | Luo | B60W 40/105 |
| 12,100,223 | B2 * | 9/2024 | Horiba | G06V 20/56 |
| 12,208,835 | B2 * | 1/2025 | Muramatsu | B62D 15/025 |
| 12,252,135 | B2 * | 3/2025 | Lee | B60K 35/10 |
| 2002/0063778 | A1 * | 5/2002 | Kormos | G02B 27/01 348/148 |
| 2005/0128061 | A1 * | 6/2005 | Yanai | B60R 1/26 348/E7.086 |
| 2010/0253496 | A1 * | 10/2010 | Nishikawa | G01D 7/00 340/459 |
| 2012/0123613 | A1 * | 5/2012 | Waki | G08G 1/166 701/1 |
| 2012/0170130 | A1 * | 7/2012 | Sasaki | B60K 35/211 359/630 |
| 2014/0236483 | A1 * | 8/2014 | Beaurepaire | B60Q 1/545 701/533 |
| 2014/0285364 | A1 * | 9/2014 | Chen | G08G 1/167 340/988 |
| 2015/0279122 | A1 * | 10/2015 | Lorenzen | G07B 15/063 705/13 |
| 2016/0159280 | A1 * | 6/2016 | Takazawa | B60K 35/22 345/8 |
| 2016/0257199 | A1 * | 9/2016 | Bark | B60K 35/211 |
| 2017/0127237 | A1 * | 5/2017 | Hayee | G01S 19/51 |
| 2017/0225691 | A1 * | 8/2017 | Yamada | B60K 31/00 |
| 2017/0227972 | A1 * | 8/2017 | Sabau | B60W 30/16 |
| 2017/0235135 | A1 * | 8/2017 | Ishiguro | B60K 35/235 345/633 |
| 2017/0276938 | A1 * | 9/2017 | Nakashima | B60K 35/10 |
| 2017/0349173 | A1 * | 12/2017 | Nishiguchi | B60W 30/09 |
| 2018/0058873 | A1 * | 3/2018 | Huang | B60Q 1/346 |
| 2018/0093619 | A1 * | 4/2018 | Han | B60Q 9/002 |
| 2018/0178839 | A1 * | 6/2018 | Ide | B62D 15/029 |
| 2018/0218713 | A1 * | 8/2018 | Kusanagi | B60K 35/22 |
| 2018/0257489 | A1 * | 9/2018 | Watanabe | B60K 35/235 |
| 2018/0299286 | A1 * | 10/2018 | Iguchi | B60K 35/10 |
| 2019/0001985 | A1 * | 1/2019 | Jerger | B60W 30/18127 |
| 2019/0039593 | A1 * | 2/2019 | Oyama | B60K 35/10 |
| 2019/0050651 | A1 * | 2/2019 | Alvarez | G06V 20/58 |
| 2019/0077418 | A1 * | 3/2019 | Quander | B60K 35/22 |
| 2019/0094040 | A1 * | 3/2019 | Lewis | B60K 35/10 |
| 2020/0010019 | A1 * | 1/2020 | Matsuba | B60R 1/12 |
| 2020/0039519 | A1 * | 2/2020 | Kinoshita | B60K 35/22 |
| 2020/0047686 | A1 * | 2/2020 | Higashiyama | B60R 11/0235 |
| 2020/0180434 | A1 * | 6/2020 | Tachibana | B60K 35/22 |
| 2020/0189614 | A1 * | 6/2020 | Ito | B60W 30/0956 |
| 2020/0369151 | A1 * | 11/2020 | Nakajima | B60K 35/10 |
| 2021/0008981 | A1 * | 1/2021 | Suzuki | B60K 35/234 |
| 2021/0162865 | A1 * | 6/2021 | Ogata | B60K 35/10 |
| 2021/0362599 | A1 * | 11/2021 | Ito | B60K 35/10 |
| 2021/0393206 | A1 * | 12/2021 | Kusanagi | A61B 5/6893 |
| 2022/0309918 | A1 * | 9/2022 | Sase | B60K 35/22 |
| 2022/0316916 | A1 * | 10/2022 | Ota | G01C 21/3859 |
| 2022/0319316 | A1 * | 10/2022 | Sakurada | B60K 35/23 |
| 2022/0383567 | A1 * | 12/2022 | Maekawa | B60K 35/23 |
| 2022/0396285 | A1 * | 12/2022 | Sunaba | B60K 35/28 |
| 2023/0022485 | A1 * | 1/2023 | Fujita | B60K 31/0008 |
| 2023/0036783 | A1 * | 2/2023 | Sakuma | B60K 35/10 |
| 2023/0060810 | A1 * | 3/2023 | Hamabe | B60K 35/22 |
| 2023/0125901 | A1 * | 4/2023 | Kurihashi | B60K 35/10 701/123 |
| 2023/0141006 | A1 * | 5/2023 | Kurihashi | B60W 30/16 340/439 |
| 2023/0191911 | A1 * | 6/2023 | Izumi | B60K 35/10 701/36 |
| 2023/0280465 | A1 * | 9/2023 | Gruenwedel | G01S 7/4808 |
| 2024/0067171 | A1 * | 2/2024 | Kuroda | B60W 30/0956 |
| 2024/0190465 | A1 * | 6/2024 | Kume | B60W 30/10 |
| 2024/0199055 | A1 * | 6/2024 | Higuchi | B60W 30/16 |
| 2024/0249626 | A1 * | 7/2024 | Tsujino | G08G 1/167 |
| 2024/0262192 | A1 * | 8/2024 | Hamdan | B60K 35/00 |
| 2025/0042398 | A1 * | 2/2025 | Ozaki | G08G 1/16 |
| 2025/0060925 | A1 * | 2/2025 | Ogata | B60K 35/10 |
| 2025/0187436 | A1 * | 6/2025 | Tomihira | B60K 35/23 |
| 2025/0242693 | A1 * | 7/2025 | Ito | B60K 35/28 |

* cited by examiner

ACTUAL SITUATION
N
INTER-VEHICLE DISTANCE D
M
R
FIRST DISTANCE THRESHOLD VALUE T

DISPLAY ON DISPLAY
SECOND DISPLAY AREA P2
FIRST DISPLAY AREA P1
NEAR DISPLAY AREA P
LA2
NF
MA
LA1
RA

IN-VEHICLE DISPLAY SYSTEM AND METHOD FOR CONTROLLING IN-VEHICLE DISPLAY SYSTEM

CROSS-REFERENCE TO RELATED APPLICATIONS

This application is based upon and claims the benefit of priority from Japanese Patent Application No. 2024-032820, filed on Mar. 5, 2024, the entire contents of which are incorporated herein by reference.

TECHNICAL FIELD

The present disclosure relates to an in-vehicle display system and a method for controlling an in-vehicle display system.

BACKGROUND

In the related art, Japanese Unexamined Patent Publication No. 2023-117717 is known as a technical document related to an in-vehicle display system. This publication discloses a vehicle control device that displays a preceding vehicle icon at a fixed position in a display in a vehicle cabin to show a recognized state of other vehicles.

SUMMARY

The display area of the display is limited. Therefore, an aspect in which a preceding vehicle icon is fixed at a position in a predetermined range on the display is known as in the above-described device. However, when host vehicle control, such as adjustment of a vehicle speed, is performed according to an inter-vehicle distance to the preceding vehicle, a target inter-vehicle distance to be controlled is set. There is a demand for intuitive and easy-to-understand display of the target inter-vehicle distance using the preceding vehicle icon on the display, rather than numerical values.

According to an aspect of the present disclosure, there is provided an in-vehicle display system that is mounted on a host vehicle and displays a situation around the host vehicle on a display in a vehicle cabin. The in-vehicle display system includes a display control unit configured to display a preceding vehicle icon on a driving lane area of the display when a preceding vehicle traveling ahead of the host vehicle is detected. The driving lane area includes a near display area, a first display area located at a back of the near display area, and a second display area located at a back of the first display area. The display control unit displays the preceding vehicle icon in the near display area according to an inter-vehicle distance between the host vehicle and the preceding vehicle when the inter-vehicle distance is less than a first distance threshold value and moves the preceding vehicle icon such that the preceding vehicle icon is closer to the first display area at the back of the near display area as the inter-vehicle distance is larger. In addition, the display control unit displays the preceding vehicle icon in the first display area when the inter-vehicle distance is equal to or greater than the first distance threshold value, and displays a second preceding vehicle icon in the second display area when a second preceding vehicle traveling ahead of the preceding vehicle is detected. The display control unit moves the second preceding vehicle icon from the second display area to the first display area when the preceding vehicle leaves the driving lane of the host vehicle while the second preceding vehicle is being detected. When the inter-vehicle distance between the host vehicle and the preceding vehicle is less than the first distance threshold value, the display control unit may change a lateral position of the preceding vehicle icon in the driving lane area according to a lateral position of the preceding vehicle with respect to at least one of the host vehicle and the driving lane.

When the preceding vehicle has made a lane change from the driving lane to an adjacent lane, the display control unit may display the preceding vehicle icon in an adjacent lane area adjacent to the driving lane area when the inter-vehicle distance between the preceding vehicle and the host vehicle at a time of the lane change is less than a second distance threshold value less than the first distance threshold value, and may not display the preceding vehicle icon after the lane change when the inter-vehicle distance between the preceding vehicle and the host vehicle at the time of the lane change is equal to or greater than the second distance threshold value.

According to another aspect of the present disclosure, there is provided a method for controlling an in-vehicle display system that is mounted on a host vehicle and displays a situation around the host vehicle on a display in a vehicle cabin. The method for controlling an in-vehicle display system includes displaying a preceding vehicle icon on a driving lane area of the display when a preceding vehicle traveling ahead of the host vehicle is detected. The driving lane area includes a near display area, a first display area located at a back of the near display area, and a second display area located at a back of the first display area. The method for controlling an in-vehicle display system includes: displaying the preceding vehicle icon in the near display area according to an inter-vehicle distance between the host vehicle and the preceding vehicle when the inter-vehicle distance is less than a first distance threshold value; moving the preceding vehicle icon such that the preceding vehicle icon is closer to the first display area at the back of the near display area as the inter-vehicle distance is larger; and displaying the preceding vehicle icon in the first display area when the inter-vehicle distance is equal to or greater than the first distance threshold value. In addition, the method for controlling an in-vehicle display system includes: displaying a second preceding vehicle icon in the second display area when a second preceding vehicle traveling ahead of the preceding vehicle is detected; and moving the second preceding vehicle icon from the second display area to the first display area when the preceding vehicle leaves the driving lane of the host vehicle while the second preceding vehicle is being detected.

According to each aspect of the present disclosure, in addition to the inter-vehicle distance between the host vehicle and the preceding vehicle, the presence of the second preceding vehicle recognized by the system can be appropriately displayed to the user.

DETAILED DESCRIPTION

Hereinafter, embodiments of the present disclosure will be described with reference to the drawings.

Figure 1:
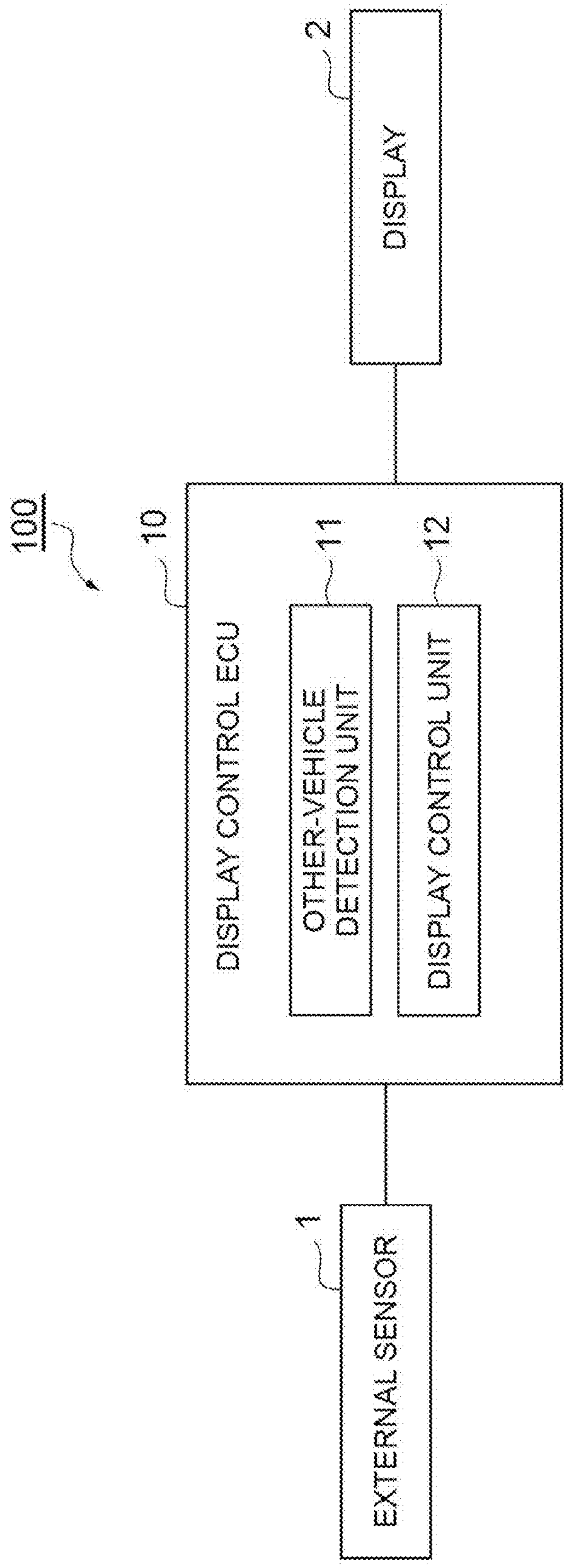
FIG. 1 is a block diagram showing an in-vehicle display system according to an embodiment.

FIG. 1 is a block diagram showing an in-vehicle display system 100 according to an embodiment. The in-vehicle display system 100 shown in FIG. 1 is a device that is mounted on a vehicle (hereinafter, referred to as a host vehicle), such as a passenger car or a freight vehicle, and displays an image corresponding to a situation around the vehicle.

The host vehicle is a vehicle having a function of controlling a vehicle speed such that an inter-vehicle distance between the host vehicle and a preceding vehicle which travels immediately ahead on a driving lane is a target inter-vehicle distance. The host vehicle may have a driving assistance function, such as adaptive cruise control (ACC), or may have an autonomous driving function including vehicle speed control. The target inter-vehicle distance is a set value that serves as a reference for controlling the vehicle speed of the host vehicle relative to the preceding vehicle traveling ahead of the host vehicle.

[Configuration of In-Vehicle Display System]

Hereinafter, a configuration of the in-vehicle display system 100 according to this embodiment will be described with reference to the drawings. As shown in FIG. 1, the in-vehicle display system 100 includes a display control electronic control unit (ECU) 10 that performs overall management of the device. The display control ECU 10 is an electronic control unit that includes a central processing unit (CPU) and a storage unit. The storage unit includes, for example, a read only memory (ROM), a random access memory (RAM), an electrically erasable programmable read-only memory (EEPROM), and the like. In the display control ECU 10, for example, the CPU executes programs stored in the storage unit to implement various functions.

An external sensor 1 and a display 2 are connected to the display control ECU 10. The external sensor 1 is a detection device that detects the situation around the host vehicle, such as a preceding vehicle. The external sensor 1 includes at least one of a camera and a radar sensor. The camera is an imaging device that images an external situation of the host vehicle. The camera is provided, for example, on a back side of a windshield of the host vehicle and captures an image in front of the vehicle. The camera transmits the captured image related to the external situation of the host vehicle to the display control ECU 10. The radar sensor is a detection device that detects objects around the host vehicle using at least one of radio waves (for example, millimeter waves) and light. Examples of the radar sensor include a millimeter wave radar and light detection and ranging (LiDAR). The radar sensor transmits information of the detected object to the display control ECU 10.

The display 2 is a display device that is provided in a cabin of the host vehicle. The display 2 may be a center display, a multi-information display (MID), or a head-up display (HUD). The display 2 displays various types of information in response to control signals from the display control ECU 10.

Next, a functional configuration of the display control ECU 10 will be described. The display control ECU 10 has an other-vehicle detection unit 11 and a display control unit 12. In addition, the display control ECU 10 may include a plurality of electronic units.

The other-vehicle detection unit 11 detects other vehicles around the host vehicle on the basis of the detection results of the external sensor 1. The other-vehicle detection unit 11 detects the preceding vehicle that travels ahead of the host vehicle on a driving lane on which the host vehicle is traveling. The other-vehicle detection unit 11 recognizes the inter-vehicle distance between the host vehicle and the preceding vehicle. In addition, when the preceding vehicle crosses a white line and makes a lane change from the driving lane to an adjacent lane, the other-vehicle detection unit 11 detects the lane change of the preceding vehicle.

When the preceding vehicle is detected, the other-vehicle detection unit 11 detects a second preceding vehicle that is traveling ahead of the preceding vehicle. The preceding vehicle to be detected may be limited to another vehicle that is within a predetermined distance from the host vehicle. Similarly, the second preceding vehicle to be detected may be limited to another vehicle that is within a predetermined distance from the host vehicle.

The display control unit 12 displays a host vehicle icon on a driving lane area of the display 2 when an ignition of the host vehicle is turned on. When the other-vehicle detection unit 11 detects the preceding vehicle, the display control unit 12 displays a preceding vehicle icon in front of the host vehicle icon on the driving lane area.

Figure 2:
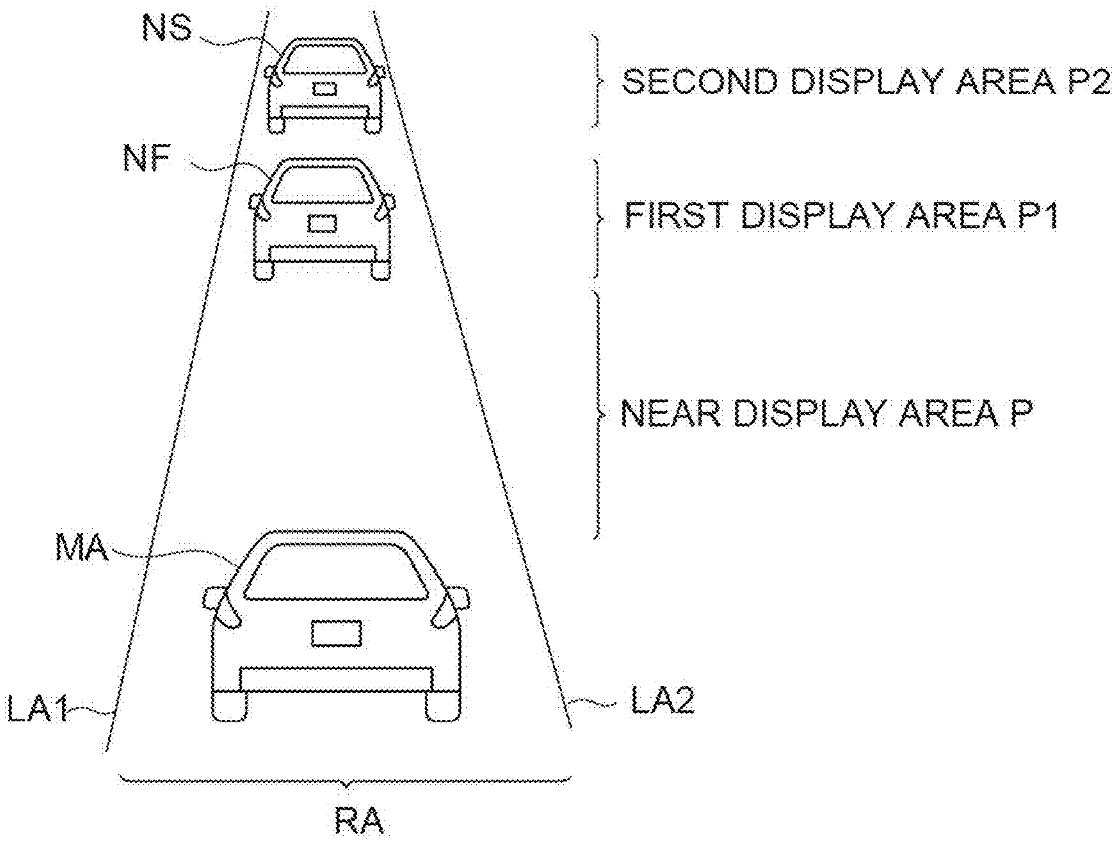
FIG. 2 is a view showing an example of display on a display.

FIG. 2 is a view showing an example of display on the display. FIG. 2 shows a driving lane area RA, a left line LA1 and a right line LA2 that form the driving lane area RA, a host vehicle icon MA, a preceding vehicle icon NF, and a second preceding vehicle icon NS. The shape of each icon is not particularly limited. Each icon may have any shape as long as it enables the user to understand that the icons correspond to the host vehicle and the preceding vehicle. The position of the host vehicle icon MA may be fixed or may not be fixed. The preceding vehicle icon NF and the second preceding vehicle icon NS may have the same shape or may have different shapes.

In addition, FIG. 2 shows a near display area P, a first display area P1, and a second display area P2 that are set on the driving lane area RA. The near display area P is an area that is located near the host vehicle icon MA on the driving lane area RA. The first display area P1 is an area that is located at the back of the near display area P when viewed from the host vehicle icon MA on the driving lane area RA. The first display area P1 may be a range in which at least one preceding vehicle icon NF can be displayed. The first display area P1 is an area that is set on the driving lane area RA, for example, by imagining a point that is 100 m ahead of the host vehicle M.

The second display area P2 is an area that is located at the back of the first display area P1 when viewed from the host vehicle icon MA on the driving lane area RA. The second display area P2 may be a range in which at least one second preceding vehicle icon NS can be displayed. The second display area P2 is an area that is set on the driving lane area RA, for example, by imagining a point that is 120 m ahead of the host vehicle M. In this way, the display control unit 12 displays the preceding vehicle and the second preceding vehicle in two stages.

In addition, the display on the display 2 is not limited to the looking-down display shown in FIG. 2. For the display on the display 2, various display aspects that enable the user to recognize the situation around the host vehicle can be adopted.

Figures 3A, 3B:
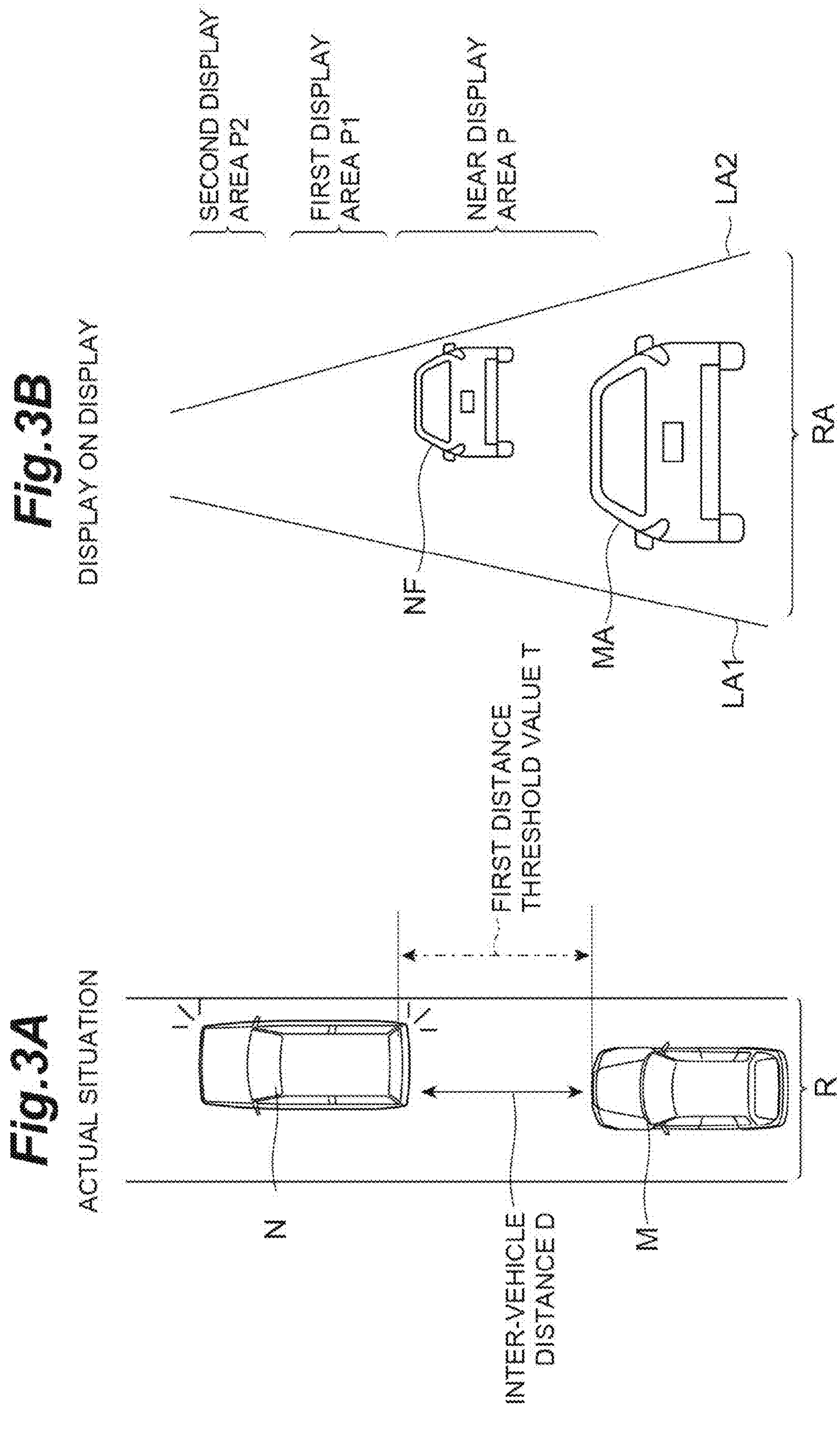
FIG. 3A is a view showing an actual situation in which an inter-vehicle distance between a host vehicle and a preceding vehicle is less than a first distance threshold value.
FIG. 3B is a view showing an example of display of a preceding vehicle icon in a near display area.

The display control unit 12 changes a display position of the preceding vehicle icon NF in the display on the display according to the inter-vehicle distance between the host vehicle and the preceding vehicle. Here, FIG. 3A is a view showing an actual situation in which the inter-vehicle distance between the host vehicle and the preceding vehicle is less than a first distance threshold value. FIG. 3A shows a host vehicle M and a preceding vehicle N. In addition, FIG. 3A shows an inter-vehicle distance D between the host vehicle M and the preceding vehicle N and a first distance threshold value T. For example, the first distance threshold value T may be set considering the size of the near display area P on the display 2. FIG. 3B is a view showing an example of the display of the preceding vehicle icon NF in the near display area P.

As shown in FIG. 3A and FIG. 3B, when the inter-vehicle distance D between the host vehicle M and the preceding vehicle N is less than the first distance threshold value T, the display control unit 12 displays the preceding vehicle icon NF in the near display area P. In addition, the display control unit 12 changes the position of the preceding vehicle icon NF in the near display area P according to the inter-vehicle distance D between the host vehicle M and the preceding vehicle N. The display control unit 12 moves the preceding vehicle icon NF such that the preceding vehicle icon NF is closer to the first display area P1 at the back of the near display area P as the inter-vehicle distance D is larger. The display control unit 12 moves the preceding vehicle icon NF in the near display area P so as to be closer to the host vehicle icon MA as the inter-vehicle distance D is smaller.

Furthermore, the display control unit 12 may change a lateral position of the preceding vehicle icon NF in the near display area P according to a lateral position of the preceding vehicle N with respect to at least one of the host vehicle M and the driving lane R. The external sensor 1 can detect the lateral position of the preceding vehicle N with respect to at least one of the host vehicle M and the driving lane R. For example, when the deviation of the lateral position of the preceding vehicle N from a center of at least one of the host vehicle M and the driving lane R is equal to or greater than a predetermined distance, the display control unit 12 can change the lateral position of the preceding vehicle icon NF to the left or the right. The display control unit 12 may continuously change the lateral position of the preceding vehicle icon NF according to the lateral position of the preceding vehicle N.

In FIG. 3A, the preceding vehicle N is traveling while being close to the right in order to make a lane change. In this case, the display control unit 12 may display the preceding vehicle icon NF in the near display area P so as to be close to the right as shown in FIG. 3B. This enables the user to understand the behavior of the preceding vehicle N in more detail from the position of the preceding vehicle icon NF.

When the inter-vehicle distance D between the host vehicle M and the preceding vehicle N is equal to or greater than the first distance threshold value T, the display control unit 12 displays the preceding vehicle icon NF in the first display area P1 (see FIG. 2). The position of the preceding vehicle icon NF displayed in the first display area P1 may be fixed or may not be fixed. The preceding vehicle icon NF may be displayed in the first display area P1 having a certain size.

When the other-vehicle detection unit 11 detects the second preceding vehicle in a state in which the preceding vehicle icon NF is displayed, the display control unit 12 displays the second preceding vehicle icon NS in the second display area P2 (see FIG. 2). The position of the second preceding vehicle icon NS displayed in the second display area P2 may be fixed or may not be fixed. The second preceding vehicle icon NS may be displayed in the second display area P2 having a certain size. This enables the user to check the presence of the second preceding vehicle on the display 2.

Figure 4B:
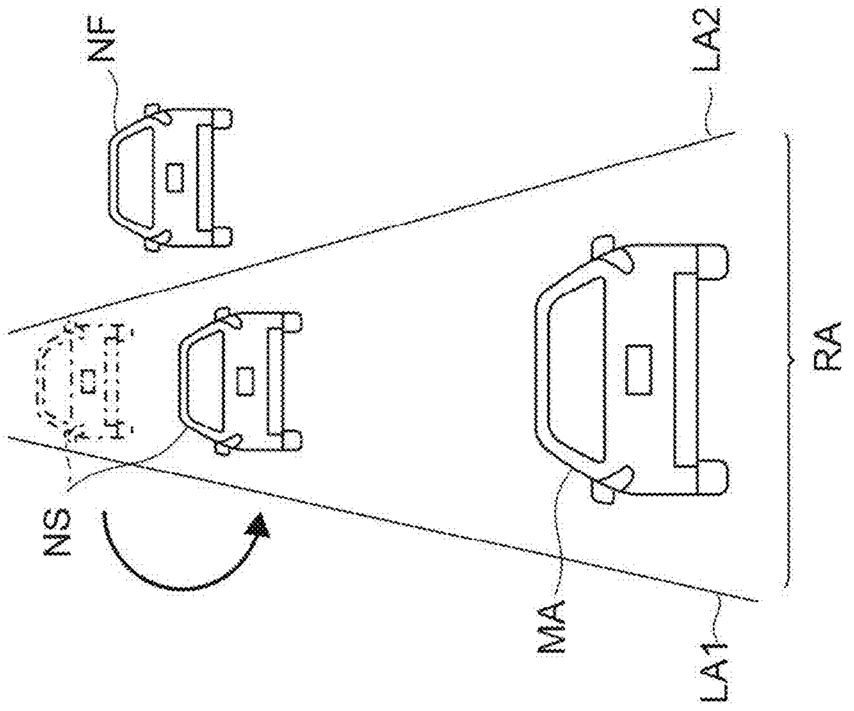
FIG. 4B is a view showing an example in which a position of a second preceding vehicle icon is changed due to the lane change of the preceding vehicle.
Figure 4A:
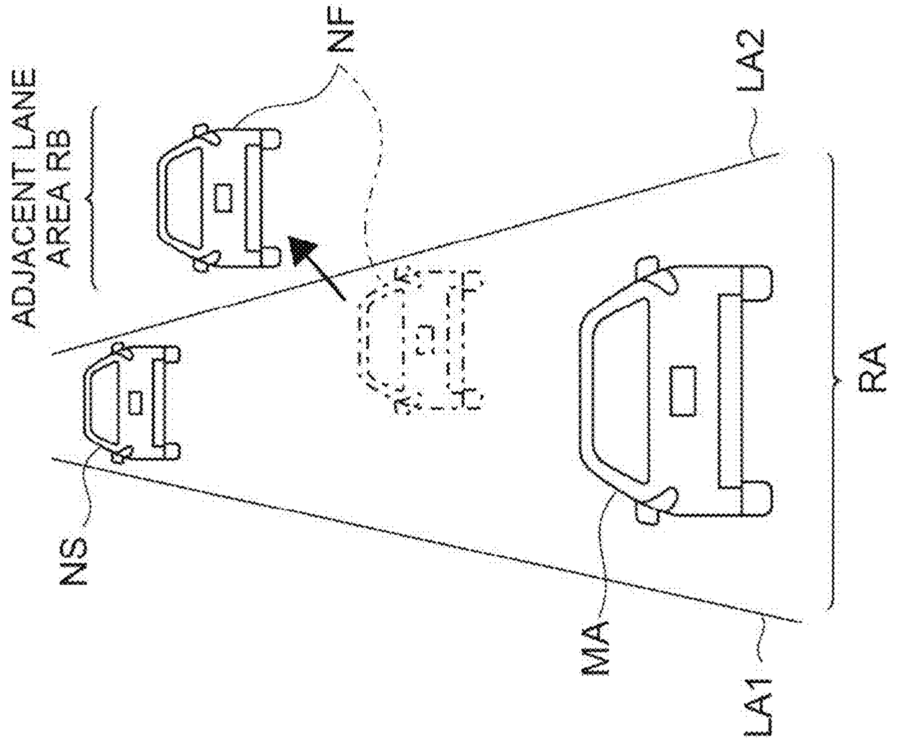
FIG. 4A is a view showing an example of display when the preceding vehicle has made a lane change.

When the preceding vehicle N has made a lane change, the display control unit 12 may display the preceding vehicle icon NF in an adjacent lane area of the display 2. Here, FIG. 4A is a view showing an example of display when the preceding vehicle has made a lane change. FIG. 4A shows an adjacent lane area RB. The adjacent lane area RB is an area that is provided on the right side of the driving lane area RA. The adjacent lane area RB is also provided on the left side of the driving lane area RA.

For example, when the preceding vehicle N has made a lane change, the display control unit 12 displays the preceding vehicle icon NF on the adjacent lane area RB on the side where the preceding vehicle N has made the lane change. The position of the preceding vehicle icon NF on the adjacent lane area RB may be fixed or may not be fixed.

When the preceding vehicle N has made a lane change, the display control unit 12 does not necessarily display the preceding vehicle icon NF on the adjacent lane area RB. The display control unit 12 may change whether or not to display the preceding vehicle icon NF on the adjacent lane area RB according to the inter-vehicle distance D between the host vehicle M and the preceding vehicle N at the time of the lane change.

Specifically, when the inter-vehicle distance D between the preceding vehicle N and the host vehicle M at the time of the lane change is equal to or greater than a second distance threshold value, the display control unit 12 may not display the preceding vehicle icon NF after the lane change. When the inter-vehicle distance D at the time of the lane change is less than the second distance threshold value, the display control unit 12 displays the preceding vehicle icon on the adjacent lane area RB. The second distance threshold value is a threshold value corresponding to a distance less than the first distance threshold value T. This enables the user to reduce unnecessary display since the influence of the lane change on the traveling of the host vehicle M is small when the preceding vehicle N has made a lane change at a position away from the host vehicle M. For example, after a predetermined period of time has elapsed, the display control unit 12 deletes the display of the preceding vehicle icon NF on the adjacent lane area RB.

If the preceding vehicle N leaves the driving lane R, when the second preceding vehicle icon NS is displayed in the second display area P2, the display control unit 12 moves the second preceding vehicle icon NS from the second display area P2 to the first display area P1. The case where the preceding vehicle N leaves the driving lane R is, for example, a case where the preceding vehicle N makes a lane change or a case where the preceding vehicle N leaves the driving lane R and enters a parking lot, a store, or the like. FIG. 4B is a view showing an example in which the display of the second preceding vehicle icon NS is changed due to the lane change of the preceding vehicle N. As shown in FIG. 4B, the display control unit 12 sets the second preceding vehicle as a new preceding vehicle N, in place of the preceding vehicle N that has made the lane change, and displays the second preceding vehicle icon NF to the user.

[Method for Controlling In-Vehicle Display System]

Figure 5:
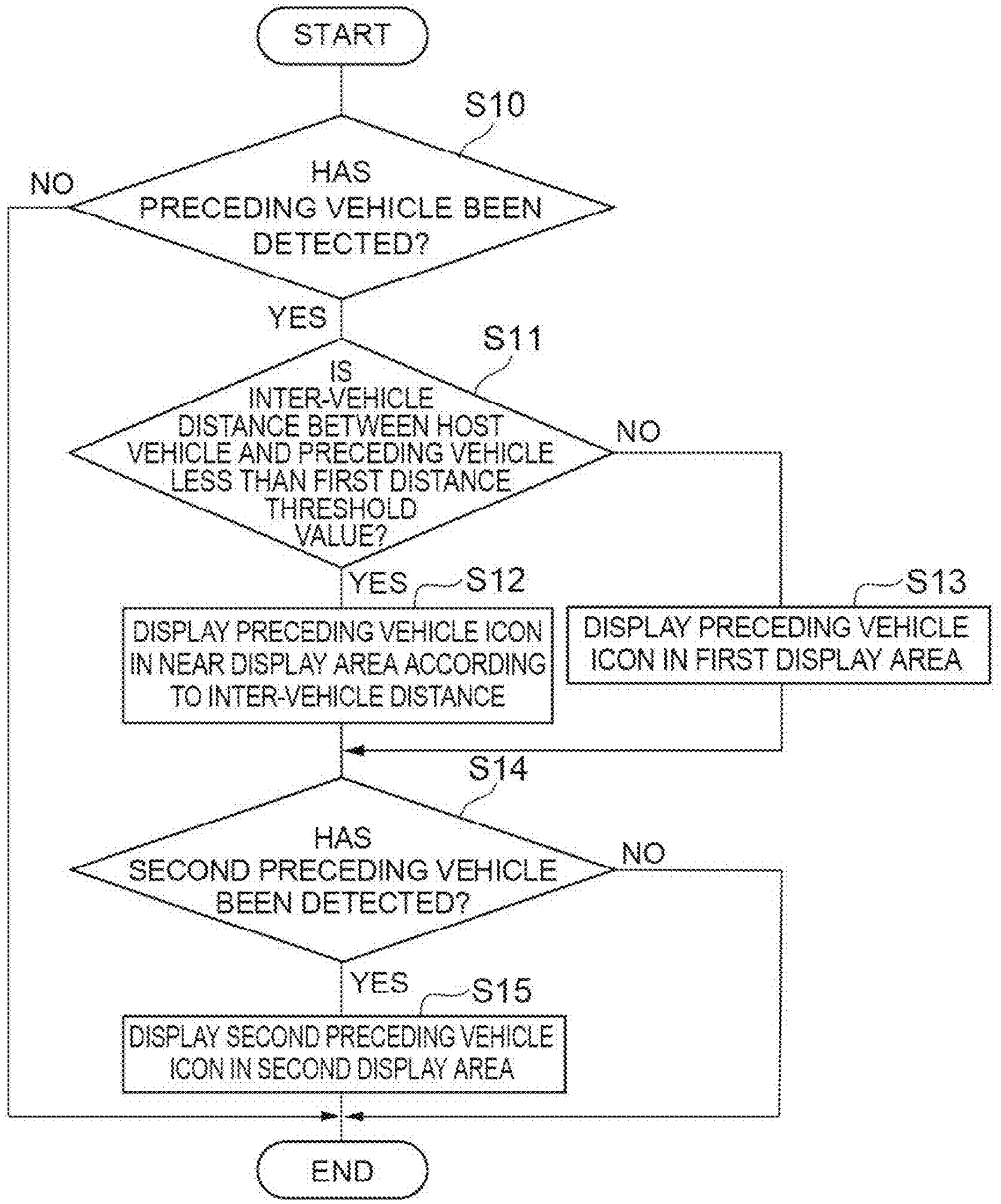
FIG. 5 is a flowchart showing an example of a preceding vehicle icon display process.

Next, a method for controlling the in-vehicle display system 100 according to this embodiment will be described with reference to the drawings. FIG. 5 is a flowchart showing an example of a preceding vehicle icon display process. The preceding vehicle icon display process shown in FIG. 5 is executed when the user turns on the display of the situation around the host vehicle on the display.

As shown in FIG. 5, in S10, the display control ECU 10 of the in-vehicle display system 100 determines whether or not a preceding vehicle has been detected by the other-vehicle detection unit 11. When determining that the preceding vehicle N has been detected (S10: YES), the display control ECU 10 proceeds to S11. When determining that the preceding vehicle N has not been detected (S10: NO), the display control ECU 10 ends this process.

In S11, the display control ECU 10 determines whether or not the inter-vehicle distance D between the host vehicle M and the preceding vehicle N is less than the first distance threshold value T using the display control unit 12. When determining that the inter-vehicle distance D between the host vehicle M and the preceding vehicle N is less than the first distance threshold value T (S11: YES), the display control ECU 10 proceeds to S12. When determining that the inter-vehicle distance D between the host vehicle M and the preceding vehicle N is not less than the first distance threshold value T (S11: NO), the display control ECU 10 proceeds to S13.

In S12, the display control ECU 10 directs the display control unit 12 to display the preceding vehicle icon NF in the near display area P. The display control unit 12 adjusts the display position of the preceding vehicle icon NF according to the inter-vehicle distance D between the host vehicle M and the preceding vehicle N. Then, the display control ECU 10 proceeds to S14.

In S13, the display control ECU 10 directs the display control unit 12 to display the preceding vehicle icon NF in the first display area P1. The position of the preceding vehicle icon NF displayed in the first display area P1 may be fixed or may not be fixed. Then, the display control ECU 10 proceeds to S14.

In S14, the display control ECU 10 determines whether or not a second preceding vehicle has been detected by the other-vehicle detection unit 11. When determining that the second preceding vehicle has been detected (S14: YES), the display control ECU 10 proceeds to S15. When determining that the second preceding vehicle has not been detected (S14: NO), the display control ECU 10 ends this process.

Figure 6:
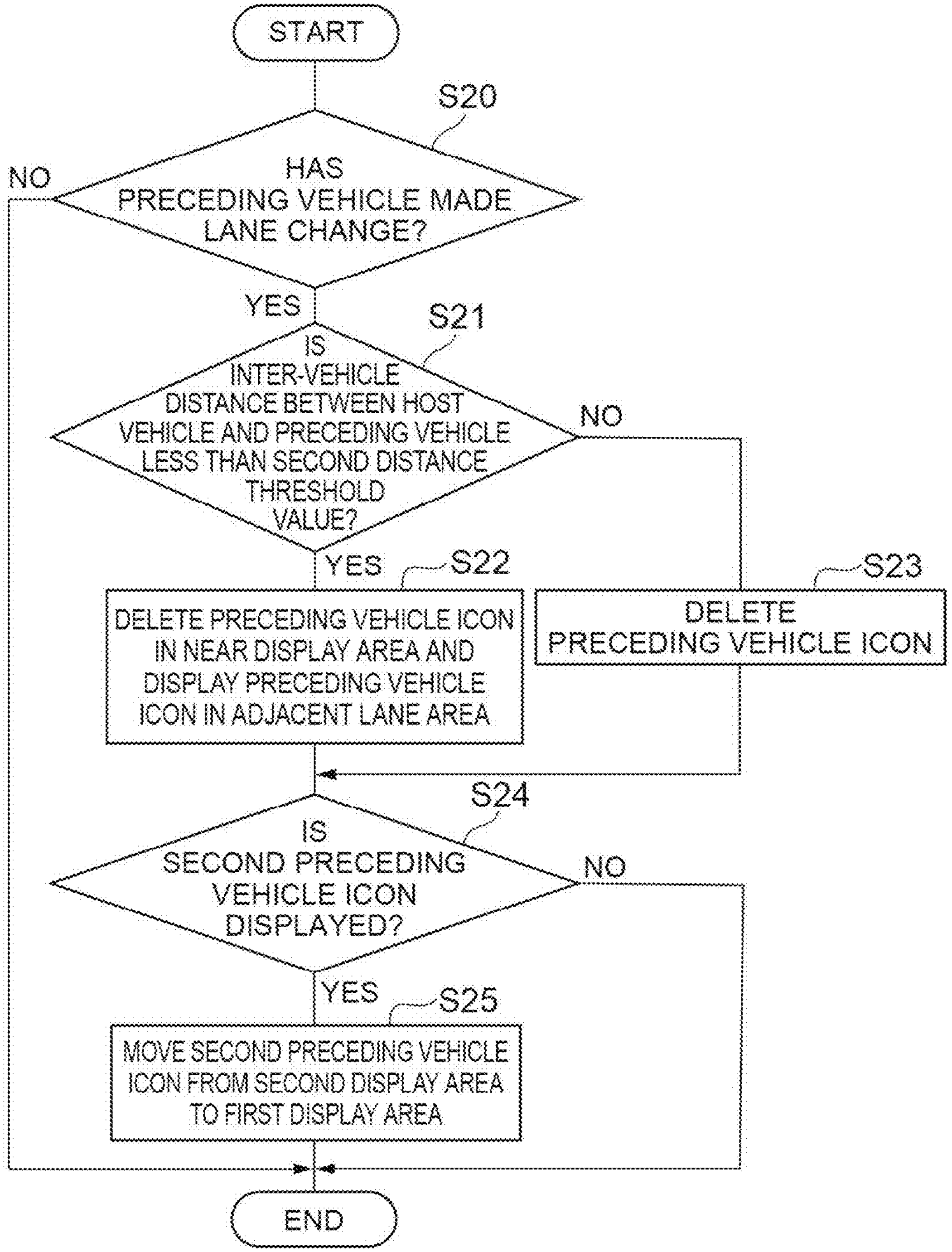
FIG. 6 is a flowchart showing an example of a preceding vehicle lane change process.

FIG. 6 is a flowchart showing an example of a preceding vehicle lane change process. The preceding vehicle lane change process is executed when the preceding vehicle icon NF is displayed.

As shown in FIG. 6, in Step S20, the display control ECU 10 determines whether or not the preceding vehicle N has made a lane change using the other-vehicle detection unit 11. When determining that the preceding vehicle N has made a lane change (S20: YES), the display control ECU 10 proceeds to S21. When determining that the preceding vehicle N has not made a lane change (S20: NO), the display control ECU 10 ends this process.

In S21, the display control ECU 10 determines whether or not the inter-vehicle distance D between the host vehicle M and the preceding vehicle N at the time of the lane change is less than the first distance threshold value T using the display control unit 12. When determining that the inter-vehicle distance D between the host vehicle M and the preceding vehicle N is less than the first distance threshold value T (S21: YES), the display control ECU 10 proceeds to S22. When determining that the inter-vehicle distance D between the host vehicle M and the preceding vehicle N is not less than the first distance threshold value T (S21: NO), the display control ECU 10 proceeds to S23.

In S22, the display control ECU 10 directs the display control unit 12 to delete the preceding vehicle icon NF from the near display area P and to display the preceding vehicle icon NF in the adjacent lane area RB. The display control ECU 10 directs the display control unit 12 to display the preceding vehicle icon NF in the adjacent lane area RB on the side, where the preceding vehicle N has made the lane change, of the right and left adjacent lane areas RB. Then, the display control ECU 10 proceeds to S24.

In S23, the display control ECU 10 deletes the preceding vehicle icon NF from the first display area P1 using the display control unit 12. Then, the display control ECU 10 proceeds to S24.

In S24, the display control ECU 10 determines whether or not the second preceding vehicle icon NS is displayed by the display control unit 12. When determining that the second preceding vehicle icon NS is displayed (S24: YES), the display control ECU 10 proceeds to S25. When determining that the second preceding vehicle icon NS is not displayed (S24: NO), the display control ECU 10 ends this process.

In S25, the display control ECU 10 moves the second preceding vehicle icon NS from the second display area P2 to the first display area P1 using the display control unit 12. Then, the display control ECU 10 ends this process.

According to the in-vehicle display system 100 and the method for controlling the in-vehicle display system 100 according to this embodiment described above, the second display area P2 for displaying the second preceding vehicle icon NS is provided in the display 2. Therefore, in addition to the inter-vehicle distance D between the host vehicle M and the preceding vehicle N, the presence of the second preceding vehicle recognized by the system can be appropriately displayed to the user. In addition, in the in-vehicle display system 100, when the inter-vehicle distance D between the host vehicle M and the preceding vehicle N is less than the first distance threshold value T, the preceding vehicle icon NF is displayed in the near display area P according to the inter-vehicle distance D. Further, the in-vehicle display system 100 moves the preceding vehicle icon NF such that the preceding vehicle icon NF is closer to the first display area P1 as the inter-vehicle distance D is larger. Therefore, the user can intuitively understand the inter-vehicle distance D from display on the display 2.

According to the in-vehicle display system 100, if the preceding vehicle N leaves the driving lane R due to a lane change or the like, when the second preceding vehicle is detected, the second preceding vehicle icon NS is moved from the second display area P2 to the first display area P1. Therefore, the user can easily understand the presence of a new preceding vehicle, as compared to the system according to the related art in which the second preceding vehicle icon NS is not displayed.

The embodiment of the present disclosure has been described above. However, the present disclosure is not limited to the above-described embodiment. The present disclosure can be implemented in various forms including the above-described embodiment and various modifications and improvements based on the knowledge of those skilled in the art.

The in-vehicle display system 100 does not necessarily detect the lane change of the preceding vehicle N. In the in-vehicle display system 100, it is not required to provide the adjacent lane area RB in the display 2, and it is not necessary to display the preceding vehicle icon NF corresponding to the preceding vehicle N after the lane change in the adjacent lane area RB. Further, in the in-vehicle display system 100, it is not required that the lateral position of the preceding vehicle icon NF can be changed in the near display area P. The in-vehicle display system 100 does not necessarily display the host vehicle icon MA.

What is claimed is:

1. An in-vehicle display system that is mounted on a host vehicle and displays a situation around the host vehicle on a display in a vehicle cabin, the in-vehicle display system comprising:

a display control unit configured to display a preceding vehicle icon on a driving lane area of the display when a preceding vehicle traveling ahead of the host vehicle is detected, wherein the driving lane area includes a near display area, a first display area located at a back of the near display area, and a second display area located at a back of the first display area, the display control unit displays the preceding vehicle icon in the near display area according to an inter-vehicle distance between the host vehicle and the preceding vehicle when the inter-vehicle distance is less than a first distance threshold value, moves the preceding vehicle icon such that the preceding vehicle icon is closer to the first display area at the back of the near display area as the inter-vehicle distance is larger, and displays the preceding vehicle icon in the first display area when the inter-vehicle distance is equal to or greater than the first distance threshold value, and the display control unit displays a second preceding vehicle icon in the second display area when a second preceding vehicle traveling ahead of the preceding vehicle is detected and moves the second preceding vehicle icon from the second display area to the first display area when the preceding vehicle leaves the driving lane of the host vehicle while the second preceding vehicle is being detected.

2. The in-vehicle display system according to claim 1, wherein, when the inter-vehicle distance between the host vehicle and the preceding vehicle is less than the first distance threshold value, the display control unit changes a lateral position of the preceding vehicle icon in the driving lane area according to a lateral position of the preceding vehicle with respect to the driving lane.

3. The in-vehicle display system according to claim 1, wherein, when the preceding vehicle has made a lane change from the driving lane to an adjacent lane, the display control unit displays the preceding vehicle icon in an adjacent lane area adjacent to the driving lane area when the inter-vehicle distance between the preceding vehicle and the host vehicle at a time of the lane change is less than a second distance threshold value less than the first distance threshold value, and does not display the preceding vehicle icon after the lane change when the inter-vehicle distance between the preceding vehicle and the host vehicle at the time of the lane change is equal to or greater than the second distance threshold value.

4. The in-vehicle display system according to claim 2, wherein, when the preceding vehicle has made a lane change from the driving lane to an adjacent lane, the display control unit displays the preceding vehicle icon in an adjacent lane area adjacent to the driving lane area when the inter-vehicle distance between the preceding vehicle and the host vehicle at a time of the lane change is less than a second distance threshold value less than the first distance threshold value, and does not display the preceding vehicle icon after the lane change when the inter-vehicle distance between the preceding vehicle and the host vehicle at the time of the lane change is equal to or greater than the second distance threshold value.

5. A method for controlling an in-vehicle display system that is mounted on a host vehicle and displays a situation around the host vehicle on a display in a vehicle cabin, the method comprising:

displaying a preceding vehicle icon on a driving lane area of the display when a preceding vehicle traveling ahead of the host vehicle is detected, the driving lane area including a near display area, a first display area located at a back of the near display area, and a second display area located at a back of the first display area;

displaying the preceding vehicle icon in the near display area according to an inter-vehicle distance between the host vehicle and the preceding vehicle when the inter-vehicle distance is less than a first distance threshold value, moving the preceding vehicle icon such that the preceding vehicle icon is closer to the first display area at the back of the near display area as the inter-vehicle distance is larger, and displaying the preceding vehicle icon in the first display area when the inter-vehicle distance is equal to or greater than the first distance threshold value;

displaying a second preceding vehicle icon in the second display area when a second preceding vehicle traveling ahead of the preceding vehicle is detected; and moving the second preceding vehicle icon from the second display area to the first display area when the preceding vehicle leaves the driving lane of the host vehicle while the second preceding vehicle is being detected.

* * * * *